May 6, 1930.                    W. R. MORRIS                    1,757,018
ACCELERATOR
Filed Feb. 28, 1927
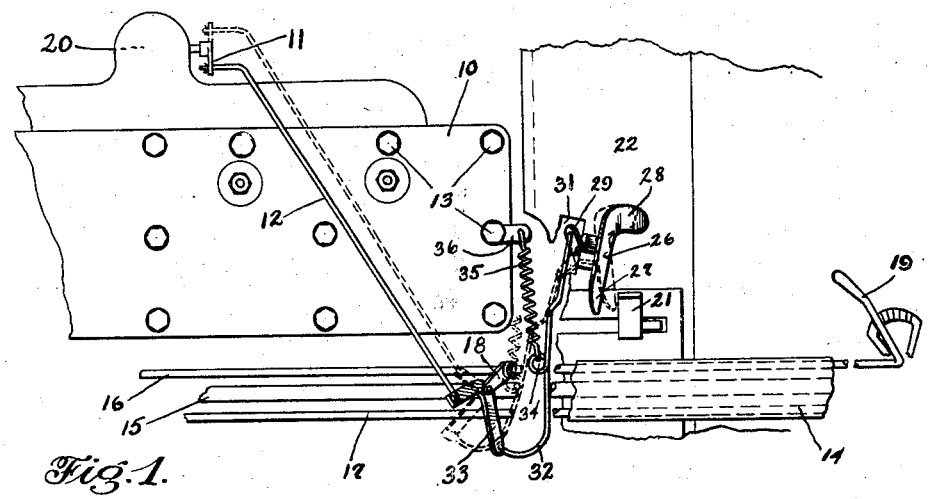
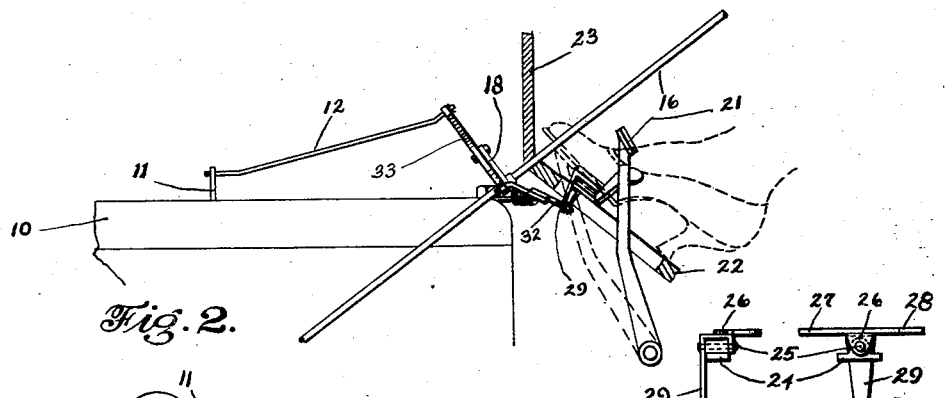
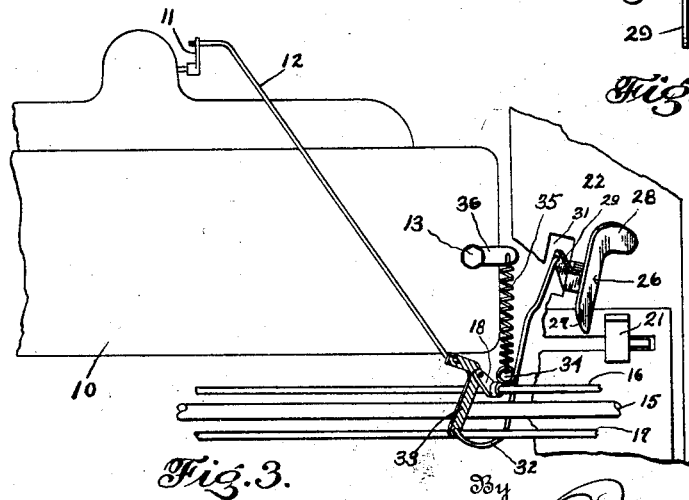
Inventor
W. R. Morris.

Patented May 6, 1930

1,757,018

UNITED STATES PATENT OFFICE

WALTER R. MORRIS, OF WINSTON-SALEM, NORTH CAROLINA

ACCELERATOR

Application filed February 28, 1927. Serial No. 171,653.

My invention relates to foot accelerators for automobiles and more especially to accelerators for the latest type of Ford automobiles, an object of this invention being to provide a foot accelerator mechanism which can be installed and operated without discontinuing the availability and use of the usual hand throttle speed control.

Another object of my invention is to provide an accelerator actuated by the foot of the driver, which may be operated from the opposite side of the engine to that on which the carburetor is located.

Another object of my invention is to provide an arrangement of parts between the foot accelerator and the throttle valve so as to enable the driver to operate the said valve without actuating or disturbing the hand operated means for controlling the flow of gasoline to the carburetor.

Another object of my invention is to provide an accelerator which will be extremely cheap, durable, simple, and comprising a minimum number of parts.
Another object of my invention is to provide a foot accelerator for automobiles which is so constructed as to cooperate with the brake pedal of the automobile in such a manner as to insure that the throttle will be closed when the brake is applied.

Some of the objects of my invention having been stated, other objects will appear as the description proceeds when taken in connection with the accompanying drawings showing a preferred embodiment of my invention, in which—

Figure 1 is a plan view of a part of an automobile showing the accelerator in place;

Figure 2 is a side elevation of Figure 1 with the steering column and spark advance control rod omitted, for sake of clearness;

Figure 3 is a plan view similar to Figure 1, but showing the parts in a different position.
Figure 4 is a side elevation of the foot pedal for operating the accelerating means;

Figure 5 is a side elevation of Figure 4.

Referring more particularly to the drawings, the numeral 10 indicates the engine of an automobile having the carburetor control lever 11, the rod 12, and the head bolts 13, while the numeral 14 indicates the steering column of the automobile, comprising the steering rod 15, the gasoline control rod 16, and the spark control rod 17. The gasoline control rod 16 has the conventional lever 18 secured thereon, and at the upper end thereof has the hand operating lever 19 for manually controlling the flow of gasoline to the carburetor, the carburetor being indicated by the numeral 20. In addition to the conventional parts just described, I have shown the foot brake 21, the floor board 22, and the dash board 23.

Having briefly described the conventional parts of an automobile with which my device is adapted to cooperate, I shall proceed to describe the various parts of my invention.

On the foot board 22 I secure the bracket 24, which is disposed transversely of the automobile. This bracket 24 has a hole therethrough for the reception of the pivot 25 for the accelerator pedal 26. This accelerator pedal 26 has oppositely projecting portions 27 and 28 and the downwardly projecting bell crank lever 29 which has the hole 30 in its lower end. This downwardly projecting bell crank lever projects through the hole 31 in the floor board 22 and to the lower end of the bell crank lever 29 is secured in the hole 30 the rod 32, which projects laterally underneath the steering column and curves upwardly and is pivotally connected to one end of the L-shaped lever 33. Intermediate its ends the rod 32 is given one complete bend to form a ring in which is adapted to be secured the coiled spring 35. The other end of the coiled spring 35 is secured in one end of the spring bracket 36, which is firmly secured to the engine by means of one of the head bolts 13 or to the under side of floor board 22. Securely and rigidly mounted on the gasoline control rod 16, is the lever 18, which is the conventional lever used in the type of car shown, and ordinarily the rod 12 is connected to the upper end of this lever, but in my invention I disconnect this rod 12 from the upper end of the lever 18 and in place thereof I pivotally secure at its apex the L-shaped lever 33, and pivotally secure the rod

12 in the end of the shorter leg of the L-shaped lever 33.

For the sake of clearness it might be stated that the position of parts as shown in Figure 1 in full lines represent the foot pedal of the accelerator and the accelerator parts in the position they assume when the engine is stopped or idling, while the dotted lines show the position of parts when the foot accelerator is depressed to its fullest extent. Figure 2 shows in dotted lines how the foot of the operator will come in contact with the foot accelerator when the foot brakes are applied. Figure 3 shows the foot accelerator closed with the hand throttle open, which makes it clear that my invention does not interfere with the hand control means.

The method of operation of my invention is as follows:

When it is desired to control the flow of gasoline by the foot accelerator, the foot of the operator is placed on the righthand end 28 of the foot accelerator pedal, and this will cause the bell crank lever to swing to the left and push the rod 32 to the left against the tension of the spring 35, which in turn will swing the L-shaped lever 33 on its pivot and push the rod 12 to the right, thereby opening the throttle control lever 11. When the foot of the operator is released from the portion 28 of the foot pedal the coiled spring 35 will pull the foot pedal, the rod 32, the L-shaped lever 33, the rod 12, and the throttle lever 11 back into normal position as shown by full lines in Figure 1. When the foot of the operator is placed on the foot brake 21, and the brakes applied, the foot of the operator will come in contact with end 27 of the foot accelerator and will positively restore the foot accelerator means to normal position in case the same should become stuck or the spring 35 should become weakened or broken. In case it should not be desired to use the foot accelerator means, the hand lever 19 may be operated to control the flow of gasoline as is clearly shown in Figure 3.

It is also clear that by the arrangement which I have provided in having the foot pedal of the accelerator extend into the path of the foot brake of the automobile that I have provided a mechanism that cannot become stuck and cause accidents, because it is impossible to place the foot on the brake pedal and depress the same without closing the throttle by the foot accelerator means.

In the drawings and specification I have set forth a preferred embodiment of my invention, and although specific terms are employed, they are used in a generic and descriptive sense only and not for purposes of limitation, the scope of the invention being set forth in the appended claims.

I claim:

1. A foot accelerator for automobiles comprising a pedal pivoted for lateral movement and having oppositely extending lateral portions one portion adapted to receive pressure to open the throttle, and the other portion being adapted to be engaged by the foot of the operator when the brakes are applied to close the throttle.

2. An accelerator for automobiles comprising a laterally swinging pedal, a downwardly projecting lever associated with the pedal, an L-shaped lever pivoted on the manual means for operating the throttle of the engine, a rod pivotally connected to the lower end of the lever associated with the foot pedal and also being pivotally connected to one end of the L-shaped lever, a rod pivotally connected to the other end of the L-shaped lever and also connected to the throttle of the engine, a coiled spring secured to the rear portion of the engine of the automobile and to the first named rod intermediate its ends, all of said parts being adapted to cooperate to open the throttle when pressure is applied to the pedal, and to close the throttle when pressure is relieved from the pedal.

3. An accelerator for automobiles comprising a pedal pivoted in close proximity to the brake pedal for lateral movement, oppositely extending lateral portions on the upper end of the pedal, one portion extending to the operator's right and being adapted to be pressed to increase the flow of gasoline to the engine of the automobile, the other lateral portion extending behind the brake pedal and being adapted to be pressed when the brakes are applied to insure the lessening of the amount of gasoline fed to the engine.

4. In an accelerator for engines of automobiles, a pedal having oppositely extending portions on the upper end thereof and being pivoted for lateral movement, a bell crank lever mounted on the conventional manual means for feeding gasoline, a rod extending from one end of the said bell crank lever to the carburetor of the automobile, a second rod extending from the other end of the bell crank lever to the lower end of the said pedal, one of the projections on the pedal being adapted to be pressed to increase the flow of gasoline, and the other extending portion on the pedal being adapted to extend into the path of the brake pedal of the automobile.

In testimony whereof I affix my signature.

WALTER R. MORRIS.